No. 750,711. PATENTED JAN. 26, 1904.
M. F. SHEA.
OPTICAL DEVICE.
APPLICATION FILED AUG. 19, 1903.
NO MODEL.

WITNESSES:
William P. Goebel.
R. B. Cavanagh.

INVENTOR
Michael F. Shea
BY
Munn
ATTORNEYS

No. 750,711.　　　　　　　　　　　　　　　　　　　　　　　Patented January 26, 1904.

UNITED STATES PATENT OFFICE.

MICHAEL F. SHEA, OF NEWPORT, RHODE ISLAND.

OPTICAL DEVICE.

SPECIFICATION forming part of Letters Patent No. 750,711, dated January 26, 1904.

Application filed August 19, 1903. Serial No. 170,013. (No model.)

*To all whom it may concern:*

Be it known that I, MICHAEL F. SHEA, a citizen of the United States, and a resident of Newport, in the county of Newport and State of Rhode Island, have invented new and useful Improvements in Optical Devices, of which the following is a full, clear, and exact description.

My invention relates to optical devices, and has particular application to certain novel and useful improvements in a device designed to contain views or pictures.

In the present instance I have in contemplation providing an optical device which may contain a number of views or plates, each of said views or pictures being brought into use in line with the vision as the box or main body of the device is turned in various directions.

A further object of my invention is to provide a box-like member having an aperture or opening for the eye through which a series of pictures hinged transversely of the box may be brought one at a time into the line of vision.

Another object of my invention is to provide an optical device simple in its construction and which may be manufactured and sold at but comparatively little expense.

With the above recited objects and others of a similar nature in view my invention consists in the construction, combination, and arrangement of parts, as is described in this specification, delineated in the accompanying drawings, and set forth in the appended claims.

Reference is to be had to the accompanying drawings, forming a part of this specification, in which similar characters of reference indicate corresponding parts in both the figures.

Figure 1:
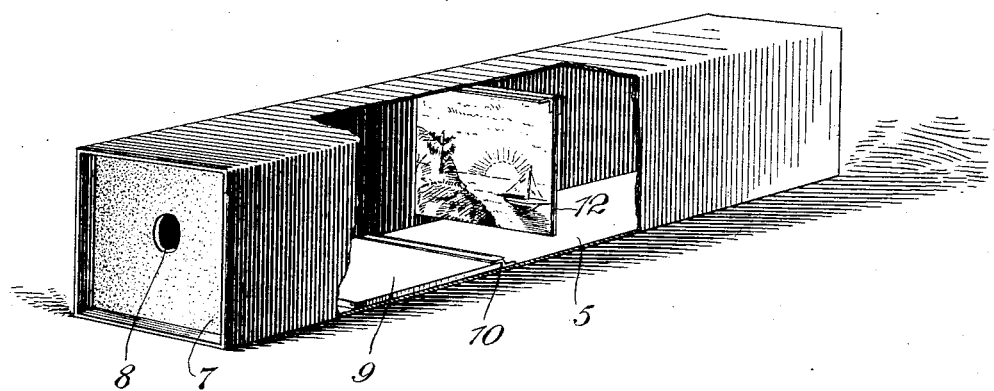
Figure 2:
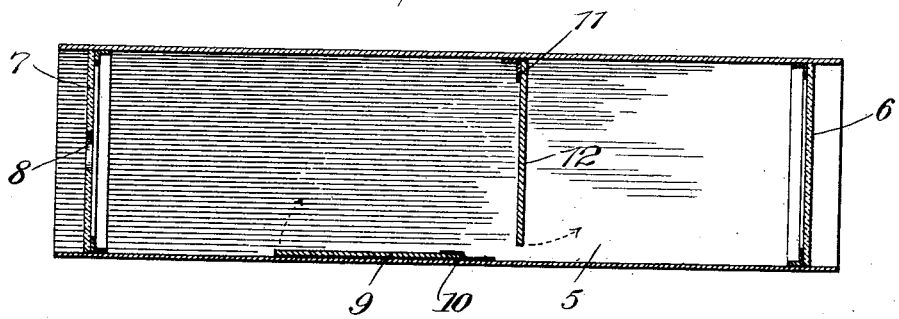

Figure 1 is a perspective view of an optical device embodying my improvements, a portion of the casing or box being broken away to show the interior arrangement of the views or pictures, and Fig. 2 is a central longitudinal sectional view taken through a device embodying my improvements.

Referring now to the accompanying drawings in detail, 5 indicates the main body portion of the device, which is in the nature of an oblong box or tube closed at its rear end through the medium of a piece of ground glass or other similar material, as shown at 6, and closed at its front end with a plate of opaque material, as at 7, which may be of the same material as the box, if desired, such plate 7 having formed centrally therein an opening, as at 8, for the eye and through which the views contained in the box portion may be seen.

Within the box and at a suitable distance from the eye portion of the device is a transparent picture 9, hinged at 10 to one of the interior sides of the tube, so that the weight of the picture will cause the latter to hang vertically when the side to which it is hinged is uppermost, the picture hanging so that the light will pass through the same from the ground-glass end into the eyepiece. On the opposite side of the tube is hingedly secured, as at 11, a second view or transparent picture 12, the views being hung with relation to each other so that there will be no interference, as one of such views will lie flat on the side of the box when the other is hanging vertically transversely of the box. It will be noted that in order to change the pictures it is only necessary to bring the opposite side of the tube uppermost, when the picture which has been examined will drop down and the one which was lying flat will hang vertically.

If desired, the pictures may be hung at varying distances apart the length of the box and be so arranged that the falling or dropping of the pictures will be as noiseless as possible.

Having thus described my invention, I claim as new and desire to secure by Letters Patent—

1. A device of the class described, comprising a box member having a transparent end member and an apertured end member, and a transparent picture or view suspended from the interior top side of the box, substantially as set forth.

2. A device of the class described, comprising a box member, and views hinged to opposite sides of the interior of the box, substantially as set forth.

3. A device of the class described, comprising a box member having a transparent end member, and an apertured front plate, a picture or view hinged to the top interior side of the box, and a second picture or view hinged to the bottom interior side of the box out of the line of travel of the top picture or view so as not to interfere with the latter when moved upon its hinge, substantially as set forth.

4. A device of the class described, comprising a box member having a transparent end portion and an apertured front plate, and transparent pictures or views suspended from opposite interior sides of the box, the construction being such that when one view is hanging vertically in the line of vision of the box, the view suspended from the opposite side will lie flat against said side, substantially as set forth.

In testimony whereof I have signed my name to this specification in the presence of two subscribing witnesses.

MICHAEL F. SHEA.

Witnesses:
JOHN J. McMANUS,
ALFRED J. O'CONNOR.